US010753446B2

(12) United States Patent
Norwich et al.

(10) Patent No.: US 10,753,446 B2
(45) Date of Patent: Aug. 25, 2020

(54) TORQUE CONVERTER HAVING CONTROLLABLE DUAL CLUTCHES

(71) Applicants: Schaeffler Technologies AG & Co. KG, Herzogenaurach (DE); Victor Norwich, Wooster, OH (US); Scott Strong, Wooster, OH (US)

(72) Inventors: Victor Norwich, Wooster, OH (US); Scott Strong, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 28 days.

(21) Appl. No.: 15/769,122

(22) PCT Filed: Nov. 10, 2015

(86) PCT No.: PCT/US2015/059952
§ 371 (c)(1),
(2) Date: Apr. 18, 2018

(87) PCT Pub. No.: WO2017/082879
PCT Pub. Date: May 18, 2017

(65) Prior Publication Data
US 2018/0299002 A1 Oct. 18, 2018

(51) Int. Cl.
*F16H 45/02* (2006.01)
*F16H 45/00* (2006.01)

(52) U.S. Cl.
CPC ....... *F16H 45/02* (2013.01); *F16H 2045/007* (2013.01); *F16H 2045/021* (2013.01);
(Continued)

(58) Field of Classification Search
CPC .............. F16H 45/02; F16H 2045/007; F16H 2045/0221–0231; F16H 2045/0273; F16H 2045/0278; F16H 2045/0205–021
See application file for complete search history.

(56) References Cited

U.S. PATENT DOCUMENTS 5,669,475 A    9/1997 Matsuoka
7,926,635 B2   4/2011 Kombowski
(Continued)

OTHER PUBLICATIONS

International Search Report for PCT/US2015/059952, Completed by the Korean Patent Office dated Aug. 4, 2016, 3 Pages.

*Primary Examiner* — David R Morris
*Assistant Examiner* — James J Taylor, II
(74) *Attorney, Agent, or Firm* — LeKeisha M. Suggs (57) ABSTRACT

A torque converter including a cover arranged to receive torque; an impeller including an impeller shell non-rotatably connected to the cover; a turbine in fluid communication with the impeller and including a turbine shell; a first clutch axially displaceable to engage the cover; a second clutch axially displaceable to engage the impeller shell; and, a vibration damper including: a first input component non-rotatably connected to a component of the first clutch; a second input component non-rotatably connected to a component of the second clutch; and, an output flange arranged to non-rotatably connect to an input shaft for a transmission. For a first lock-up mode, the first and second clutches are arranged to close to transmit torque from the cover to the first and second input components, respectively.

18 Claims, 11 Drawing Sheets

(52) U.S. Cl.
CPC ........... *F16H 2045/0215* (2013.01); *F16H 2045/0231* (2013.01); *F16H 2045/0247* (2013.01); *F16H 2045/0278* (2013.01)

(56) References Cited

U.S. PATENT DOCUMENTS

| | | | |
|---|---|---|---|
| 8,201,675 B2* | 6/2012 | Heeke | F16H 41/26 |
| | | | 192/3.22 |
| 9,285,025 B2* | 3/2016 | Matsuoka | F16H 45/02 |
| 2008/0149440 A1* | 6/2008 | Sturgin | F16D 25/10 |
| | | | 192/3.25 |
| 2010/0105519 A1 | 4/2010 | Kasuya et al. | |
| 2012/0031722 A1* | 2/2012 | Takikawa | F16H 45/02 |
| | | | 192/3.28 |
| 2012/0181130 A1 | 7/2012 | Fukunaga | |
| 2015/0198227 A1 | 7/2015 | Blough | |

* cited by examiner

PRIOR ART

Fig. 11

TORQUE CONVERTER HAVING CONTROLLABLE DUAL CLUTCHES

CROSS-REFERENCE TO RELATED APPLICATIONS

This application is the U.S. National Phase of PCT Appln. No. PCT/US2015/059952 filed Nov. 10, 2015, the entire disclosure of which is incorporated by reference herein.

TECHNICAL FIELD

The present disclosure relates broadly to a torque converter including dual clutches to increase torque-carrying capacity of the torque converter, and a seal to increase controllability of the clutches and reduce energy losses.

BACKGROUND

Figure 11:
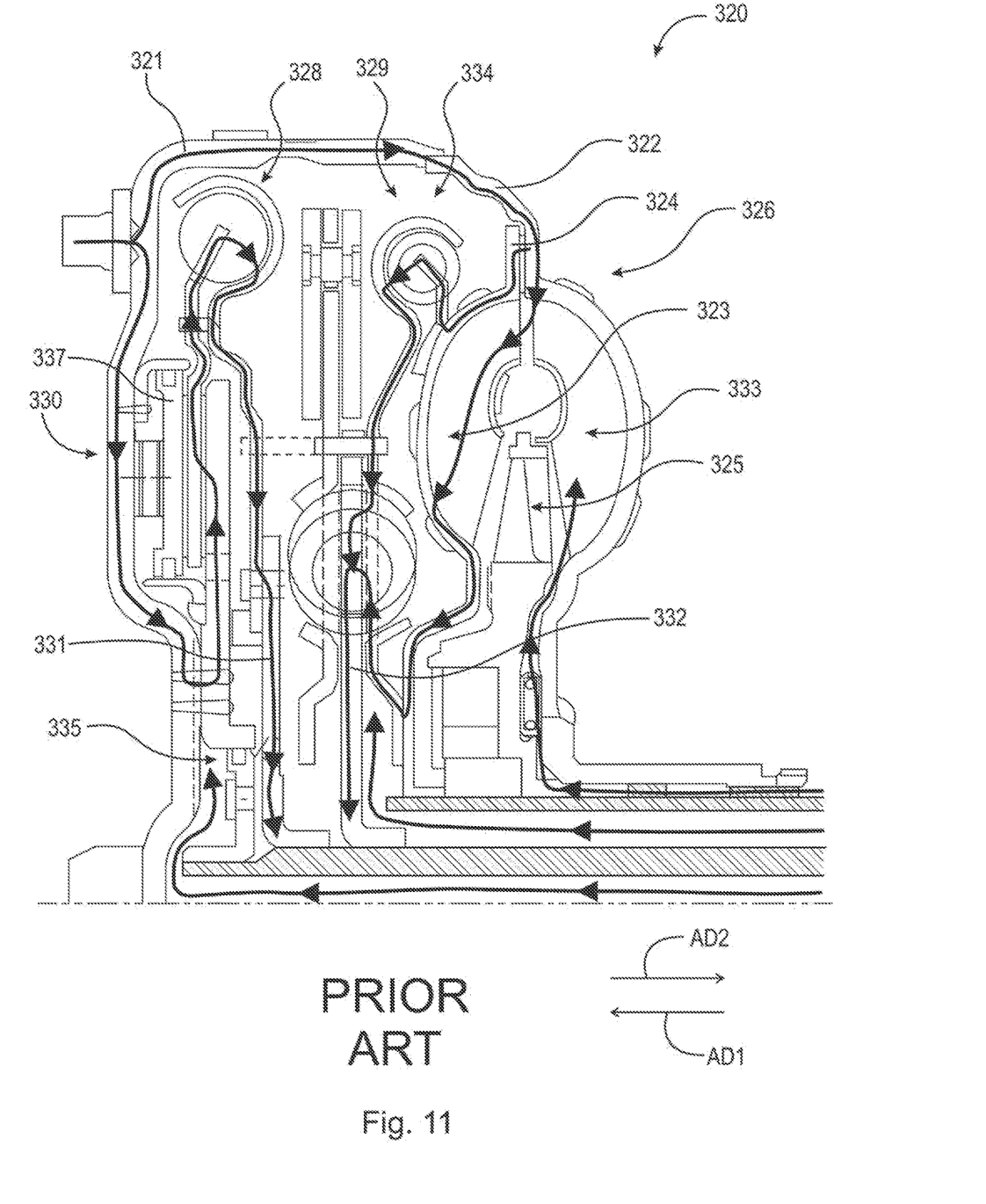

FIG. 11, from U.S. Patent Pre-Grant Publication No. US 2015/0198227 A1 (Blough), illustrates prior art torque converter 320. Prior art torque converter 320 includes cover 321 arranged to receive torque, pump 322 non-rotatably connected to cover 321, turbine 323 including turbine shell 324, stator 325, turbine clutch 326, torsional vibration dampers 328 and 329, and torque converter clutch 330. Torque converter clutch 330 includes piston 337 arranged to be displaced in axial direction AD2 away from cover 321. Dampers 328 and 329 include output flanges 331 and 332, respectively, arranged to connect to an input shaft for a transmission. Torque converter 320 is a three-pass torque converter, with chambers 333, 334, and 335 controlling operation of clutches 326 and 330.

Torque converter 320 is designed to enable torque transmission through either clutch 326 or clutch 330. However, it is inefficient to simultaneously transmit torque through clutches 326 and 330, for example by simultaneously closing the clutches. To close clutch 326, chamber 334 is pressurized to displace turbine shell 324 in axial direction AD2. To minimize the amount of pressure needed to close clutch 326, pressure in chamber 333 is kept low. However, pressurizing chamber 334 urges piston 337 in direction AD1, which opens clutch 326. To close clutch 330, chamber 335 is pressurized to displace piston 337 in direction AD2. To simultaneously close clutches 326 and 330, chambers 334 and 335 must both be pressurized. Thus, chamber 334 is pressurized to obtain the desired clamping of clutch 326 and chamber 335 must be pressurized to obtain the desired clamping of clutch 330 plus counteract the pressure in chamber 334. This leads to an undesirable increase in the energy output of the pump supplying fluid pressure to torque converter 320. Further, the fluid pressure available to a torque converter is typically supplied by a pump in a transmission and is limited due to operating requirements for the transmission. Therefore, there may not be sufficient fluid pressure available to properly pressurize both chambers 334 and 335. In addition, when clutch 326 is closed, there are energy losses due to the cooling flow from chamber 334 to chamber 333 through cooling channels typically found in clutch friction material. Specifically, pressure in chamber 333 is kept deliberately low to reduce pressure needed in chamber 334, but the pressure differential between chambers 333 and 334 undesirably increases flow out of chamber 334, which must be replenished by the pump.

SUMMARY

According to aspects illustrated herein, there is provided a torque converter including an axis of rotation; a cover arranged to receive torque; an impeller including an impeller shell non-rotatably connected to the cover; a turbine in fluid communication with the impeller and including a turbine shell; a first clutch; a second clutch; a vibration damper including: a first input component non-rotatably connected to a component of the first clutch; a second input component non-rotatably connected to a component of the second clutch; and, an output flange arranged to non-rotatably connect to an input shaft for a transmission. For a first lock-up mode, the first and second clutches are arranged to close to transmit torque from the cover to the first and second input components, respectively According to aspects illustrated herein, there is provided a torque converter including an axis of rotation; a cover arranged to receive torque; an impeller including an impeller shell non-rotatably connected to the cover, a turbine in fluid communication with the impeller and including a turbine shell; a first clutch axially displaceable to engage the cover; a second clutch axially displaceable to engage the impeller shell; and, a vibration damper including: a first input component non-rotatably connected to a component of the first clutch; a second input component non-rotatably connected to a component of the second clutch; and, an output flange arranged to non-rotatably connect to an input shaft for a transmission. For a first lock-up mode, the first and second input components are arranged to transmit torque from the cover to the output flange. The component for the second clutch includes the turbine shell; or, the second clutch includes a piston separate from the turbine shell, and the component for the second clutch includes the piston.

According to aspects illustrated herein, there is provided a torque converter including an axis of rotation; a cover arranged to receive torque; an impeller including an impeller shell non-rotatably connected to the cover; a turbine in fluid communication with the impeller and including a turbine shell; a first clutch; a second clutch; a vibration damper including: a first input component non-rotatably connected to a component of the first clutch; a second input component non-rotatably connected to a component of the second clutch; a seal element sealed against the first and second input components; and, an output flange arranged to non-rotatably connect to an input shaft for a transmission; a first chamber at least partially formed by the impeller and the component of the second clutch; a second chamber at least partially formed by the component of the first clutch, the seal element, and the first and second input components; and, a third chamber at least partially formed by the cover and the component of the first clutch.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure. By "non-rotatably connected" components we mean that a first component is connected to a second component so that anytime the first component rotates, the second component rotates with the first component, and anytime the second component rotates, the first component rotates with the second component. Axial displacement between the first and second component is possible.

Figure 1:
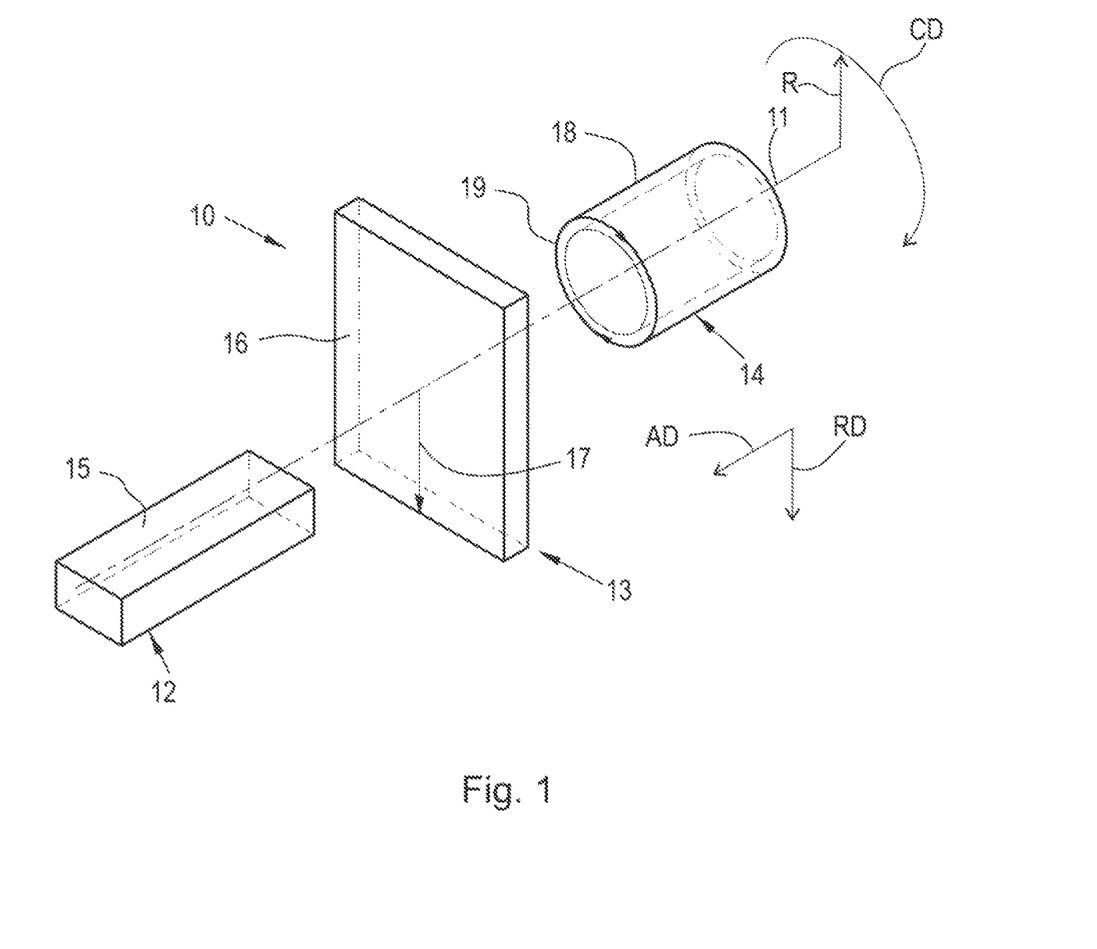
FIG. 1 is a perspective of a cylindrical coordinate system used to demonstrate spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane parallel to axis 11. Axis 11 is coplanar with planar surface 15 however, it is not necessary for an axial surface to be coplanar with axis 11. A radial surface, such as surface 16 of object 13, is formed by a plane orthogonal to axis 11 and coplanar with a radius, for example, radius 17. Surface 18 of object 14 forms a circumferential, or cylindrical, surface. For example, circumference 19 forms a circle on surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively.

Figure 2:
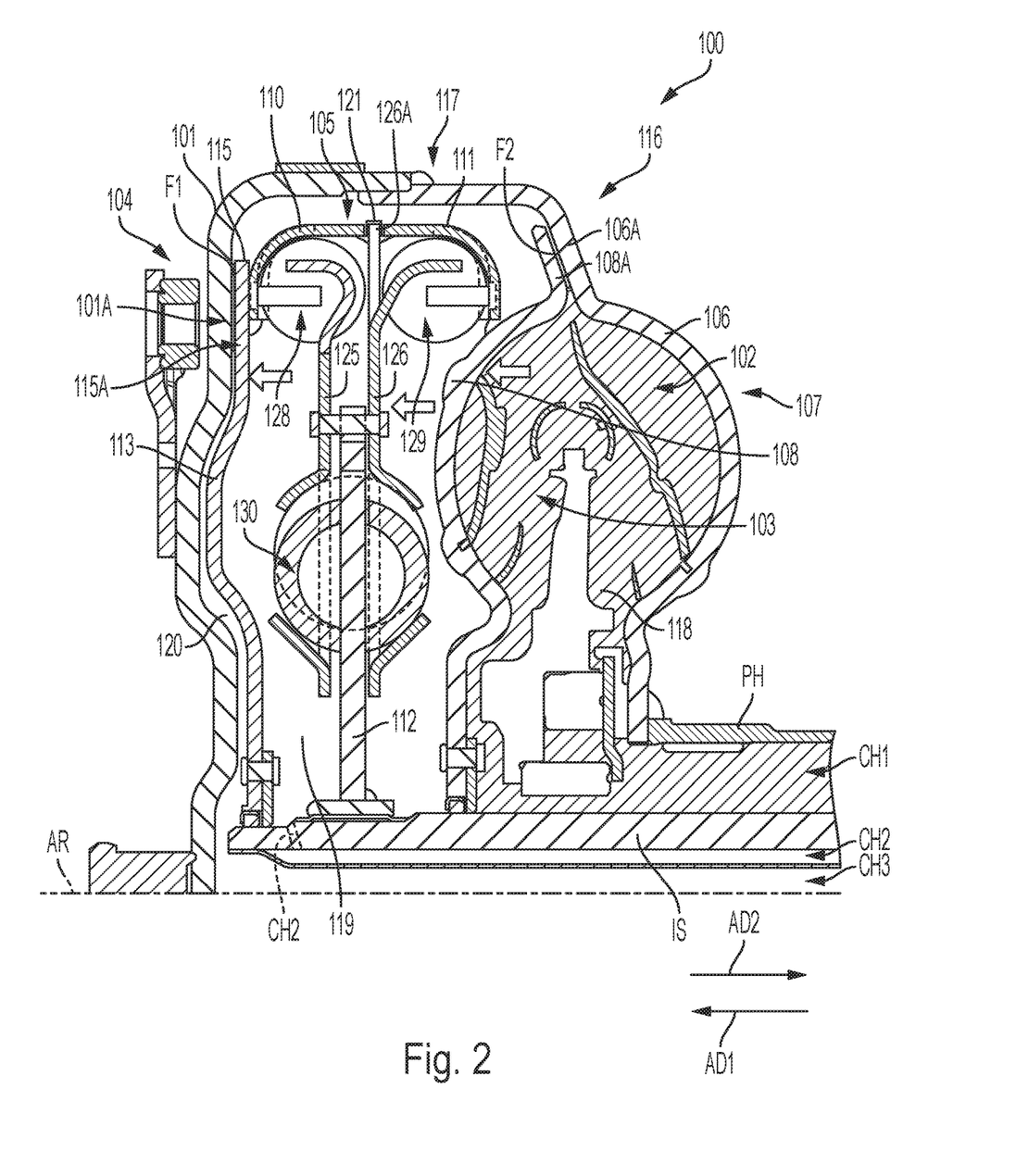
FIG. 2 is a partial cross-sectional view of a torque converter including dual clutches, a simplified vibration damper, and a seal element, in a first lock-up mode.

FIG. 2 is a partial cross-sectional view of torque converter 100 including dual clutches, a simplified vibration damper, and a seal element, in a first lock-up mode.

Figure 3:
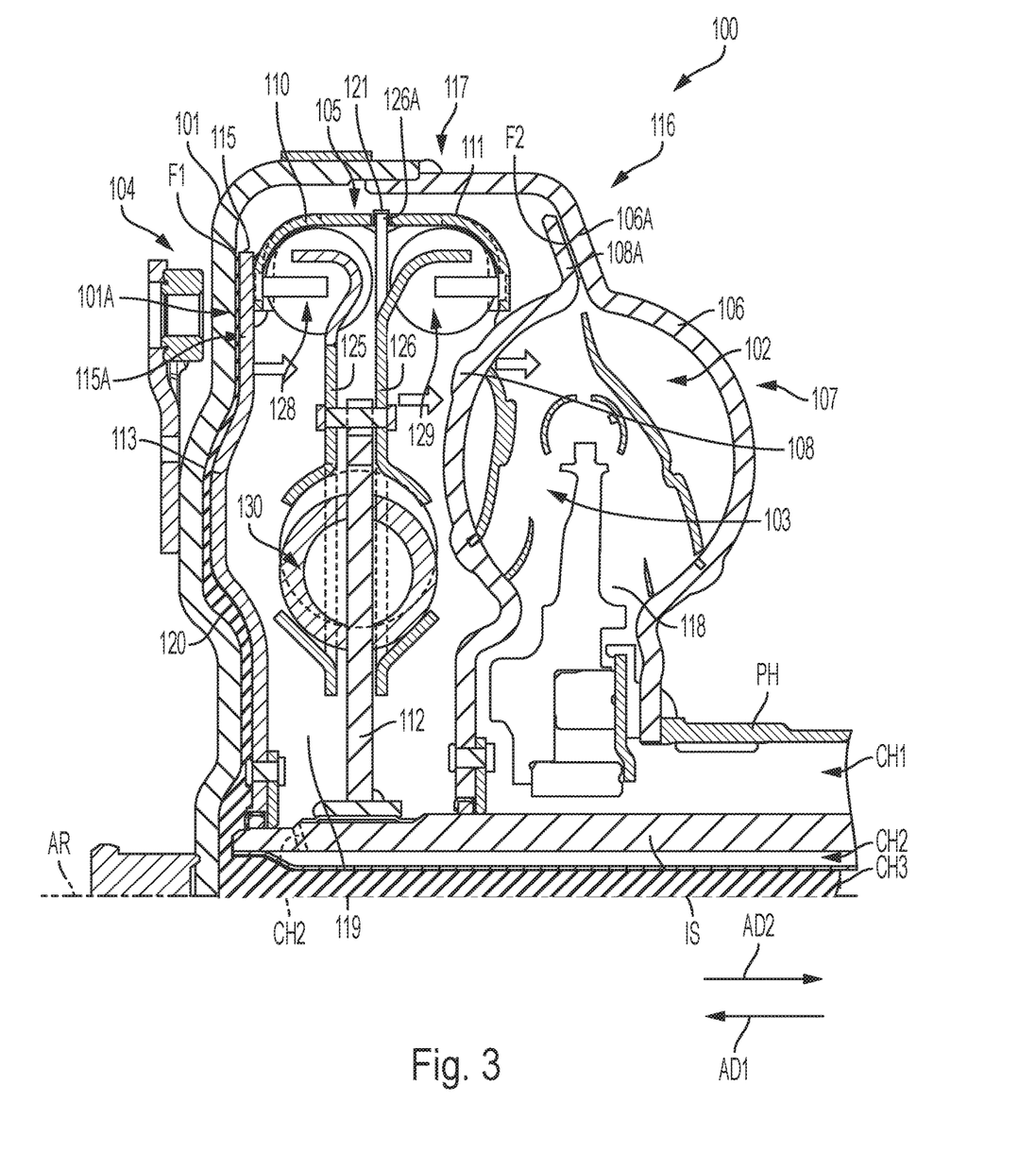
FIG. 3 is a partial cross-sectional view of the torque converter of FIG. 2 in a second lock-up mode.

FIG. 3 is a partial cross-sectional view of torque converter 100 of FIG. 2 in a second lock-up mode.

Figure 4:
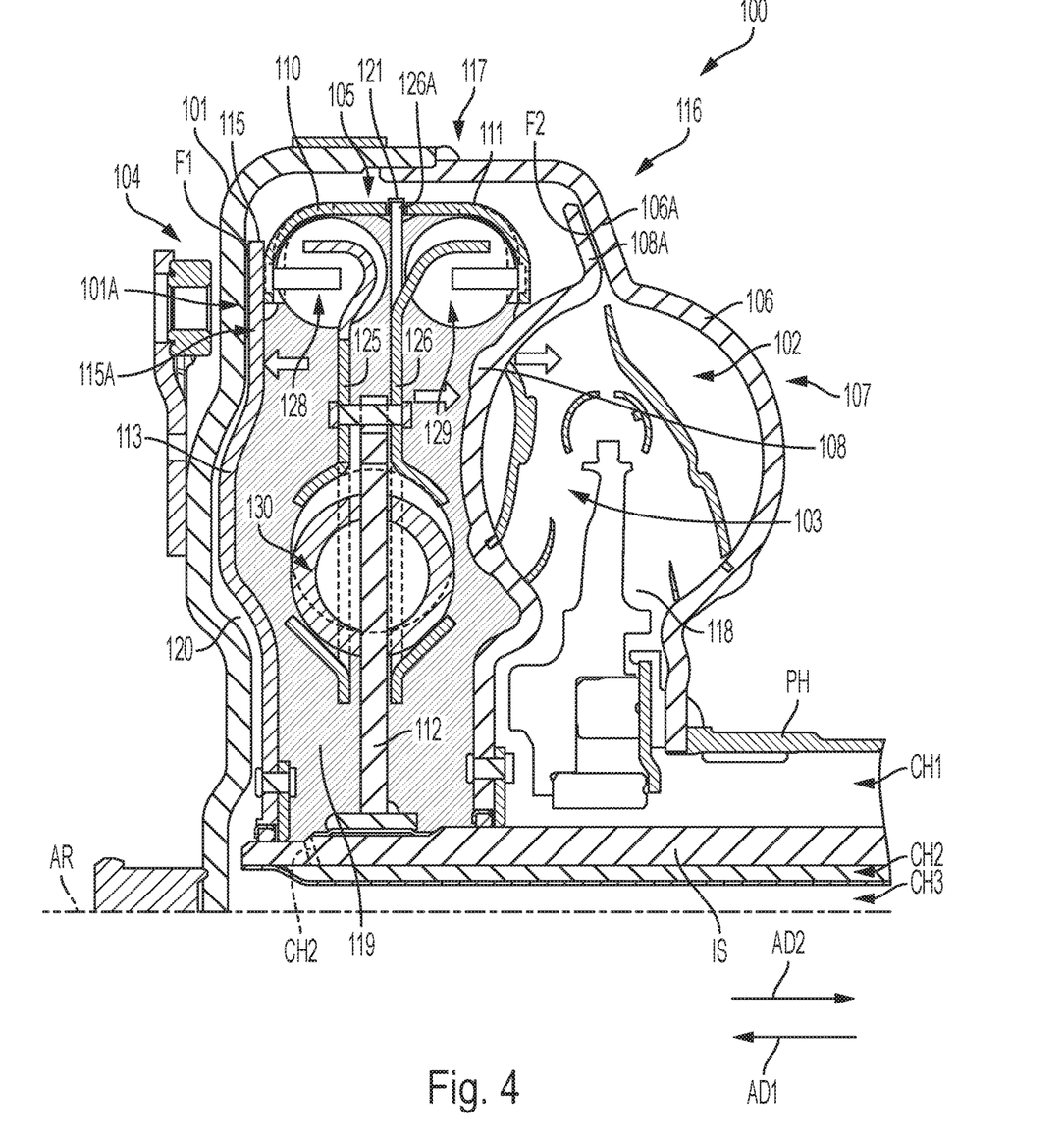
FIG. 4 is a partial cross-sectional view of the torque converter of FIG. 2 in a third lock-up mode.

FIG. 4 is a partial cross-sectional view of torque converter 100 of FIG. 2 in a third lock-up mode. The following should be viewed in light of FIGS. 2 through 4. Torque converter 100 includes axis of rotation AR, cover 101, impeller 102, turbine 103, clutches 104 and 116 and simplified vibration damper 105. Cover 101 is arranged to receive torque from an engine (not shown). Impeller 102 includes impeller shell 106 non-rotatably connected to cover 101. Turbine 103 is in fluid communication with impeller 102 and turbine 103 includes turbine shell 108. Vibration damper 105 includes input components 110 and 111 and output flange 112. Input component 110 is non-rotatably connected to a component of clutch 104 and input component 111 is non-rotatably connected to a component of clutch 116. Input components 110 and 111 are arranged to transmit torque from cover 101 to output flange 112.

Output flange 112 is arranged to non-rotatably connect to input shaft IS for a transmission (not shown). In the lock-up mode shown in FIG. 2, clutch 104 is closed while clutch 116 is open. Clutch 104 is arranged to close to transmit torque from cover 101 to input component 110.

In the lock-up mode shown in FIG. 3, clutch 104 is open and clutch 116 is closed. Clutch 116 is arranged to close to transmit torque from cover 101 to input component 111. In the lock-up mode shown in FIG. 4, clutches 104 and 116 are both closed. Clutches 104 and 116 are arranged to close to transmit torque from cover 101 to input components 110 and 111, respectively.

In an example embodiment, clutch 104 includes axially displaceable piston 115 and the component of clutch 104 non-rotatably connected to input component 110 includes piston 115, which is arranged to non-rotatably connect to cover 101. For the lock-up mode shown in FIG. 2, piston 115 is axially displaceable to frictionally engage cover 101 and piston 115 is arranged to transmit torque to input component 110. Friction material F1 is arranged between portion 115A of piston 115 and portion 101A of cover 101 proximate input component 110.

In an example embodiment, the component of clutch 116 connected to input component 111 is turbine shell 108. Clutch 116 includes radially outermost portion 108A of turbine shell 108, portion 106A of impeller shell 106 and friction material F2 between portions 106A and 108A. In an example embodiment, portion 108A is integrally formed with turbine shell 108. In an example embodiment, clutch 116 is an integrated turbine clutch arranged between torus 107 and radially outermost part 117 of cover 101. For the lock-up mode shown in FIG. 3, turbine shell 108 is arranged to axially displace to frictionally engage impeller shell 106.

Torque converter 100 includes separately controllable chambers 118, 119 and 120 arranged to be pressurized to open and close clutches 104 and 116. In an example embodiment, torque converter 100 includes seal element 121 sealing input components 110 and 111 against a component of damper 105, for example plate 126 described below. Chamber 118 is at least partially formed by impeller 102 and a component of clutch 116, for example, turbine shell 108. Chamber 119 is at least partially formed by input components 110 and 111, seal element 121, and respective components of clutches 104 and 116, for example, piston 115 and turbine shell 108. Chamber 120 is at least partially formed by cover 101 and a component of clutch 104, for example, piston 115.

For the lock-up mode shown in FIG. 2, fluid pressure in chamber 118 is higher than respective fluid pressures in chambers 119 and 120. In an example embodiment, only chamber 118 is pressurized. Turbine shell 108 and input component 111 are urged in axial direction AD1. Clutch 116 is opened and input component 111 applies a force to input component 110 to close clutch 104. Clutch 104 is arranged to close to transmit torque from cover 101 to input component 110. In an example embodiment, lining F1 includes grooves to enable a cooling flow through lining F1.

In the lock-up mode shown in FIG. 3, turbine shell 108 is arranged to axially displace in axial direction AD2, opposite axial direction AD1, to frictionally engage impeller shell 106. Friction material F2 is arranged between portion 106A of impeller shell 106 and portion 108A of turbine shell 108. For the lock-up mode shown in FIG. 3, fluid pressure in chamber 120 is higher than respective fluid pressures in chambers 118 and 119. Chambers 118 and 119 are pressurized at lower levels or are vented. Turbine shell 108 is arranged to frictionally engage impeller shell 106 to transmit torque from impeller shell 106 to input component 111.

In the lock-up mode shown in FIG. 3, the displacement of piston 115 in direction AD2 generates an axial force in axial direction AD2 on input component 110. Component 110 transmits the force to input component 111 to displace turbine shell 108 in direction AD2.

In the lock-up mode shown in FIG. 4, fluid pressure in chamber 119 is higher than respective fluid pressures in chambers 118 and 120 and input components 110 and 111 are arranged to transmit torque, respectively, from cover 101 and impeller shell 106, respectively, to output flange 112. Chambers 118 and 120 are pressurized at lower levels or are vented. In the example of FIG. 4, piston 115 is displaced in axial direction AD1 and turbine shell 108 is displaced in axial direction AD2. Due to seal element 121, energy losses caused by fluid leaking from high pressure chamber 119 to lower pressure chambers 118 and 120 via cooling grooves in clutches 116 and 104, respectively, are prevented and controllability of clutches 104 and 116 is improved. A lower pressure cooling flow, by-passing chamber 119, can be provided between chambers 118 and 120.

In an example embodiment, vibration damper 105 includes cover plates 125 and 126, and springs 128, 129 and 130. Cover plates 125 and 126 are non-rotatably connected. Spring 128 is engaged with input component 110 and cover plate 125. Spring 129 is engaged with input component 111 and cover plate 126. Spring 130 is engaged with cover plate 125, cover plate 126, and output flange 112. In an example embodiment, spring 128 is radially aligned and axially offset with respect to spring 129.

For the lock-up modes shown in FIGS. 2 and 3, input components 110 and 111, respectively, are arranged to transmit torque from cover 101 to cover plates 125 and 126, respectively. Cover plates 125 and 126 transmit the torque to flange 112. For the lock-up mode shown in FIG. 4, input components 110 and 111, respectively, are arranged to transmit torque from cover 101 to cover plates 125 and 126, respectively. Cover plates 125 and 126 are arranged to transmit the torque to output flange 112. In an example embodiment, output flange 112 is located in chamber 119.

In an example embodiment, cover plate 126 includes radially outermost distal portion 126A and seal element 121 is fixed to radially outermost portion 126A and seals input components 110 and 111 against cover plate 126.

Channels CH1, CH2 and CH3 are connected to chambers 118, 119 and 120, respectively, and are hydraulically isolated from each other. Channel CH1 is formed by the pump hub PH and input shaft IS. Channels CH2 and CH3 are within input shaft IS. Channels CH1, CH2 and CH3 are arranged to hydraulically connect to a pump for the transmission. In an example embodiment, channels CH1, CH2 and CH3 are all controlled using a hydraulic valve which is able to distribute pressure flow from the transmission pump.

Figure 5:
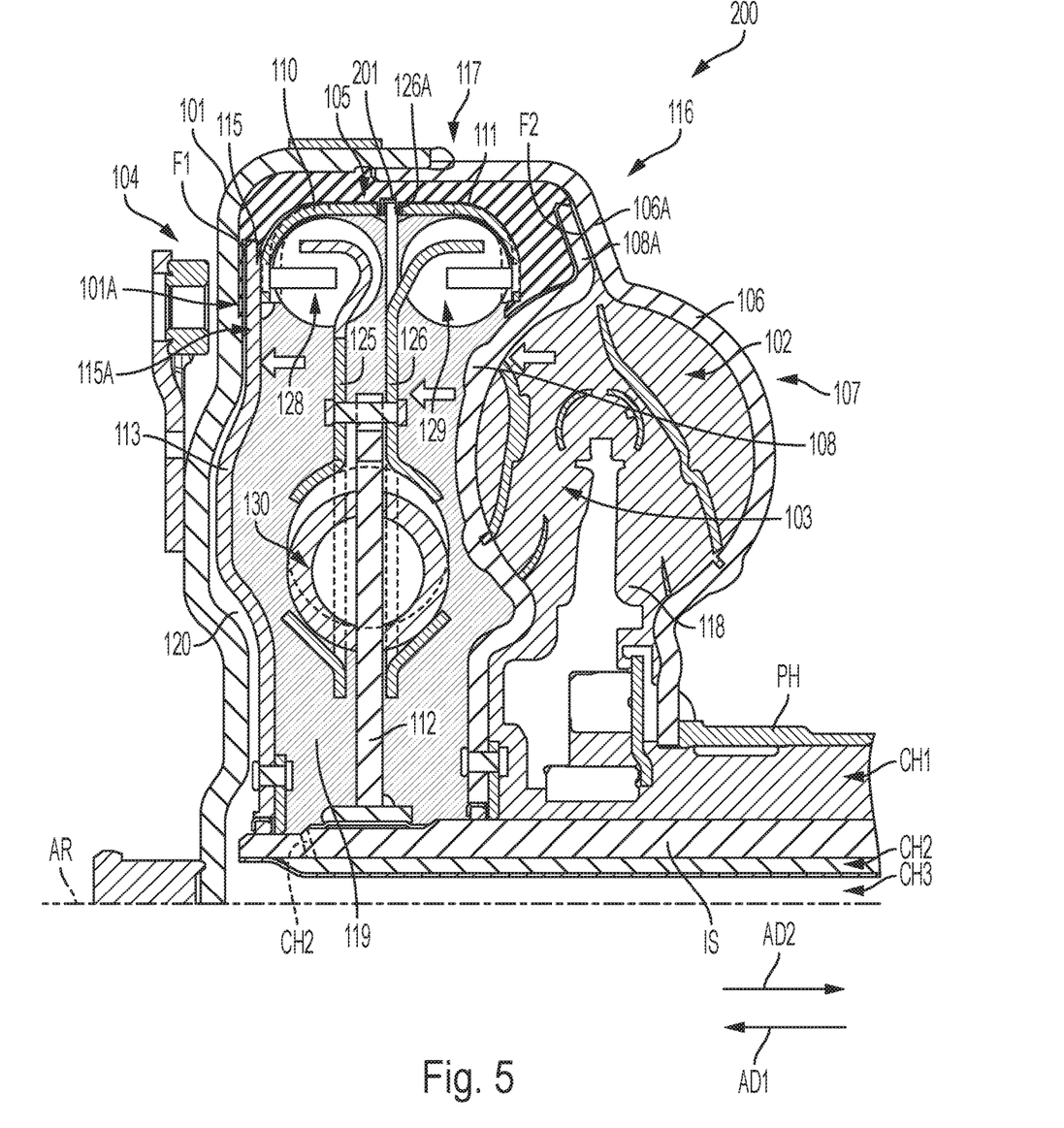
FIG. 5 is a partial cross-sectional view of a torque converter including dual clutches and a simplified vibration damper without a seal element, in a first lock-up mode.

FIG. 5 is a partial cross-sectional view of torque converter 200 including dual clutches and a simplified vibration damper without a seal element, in a first lock-up mode.

Figure 6:
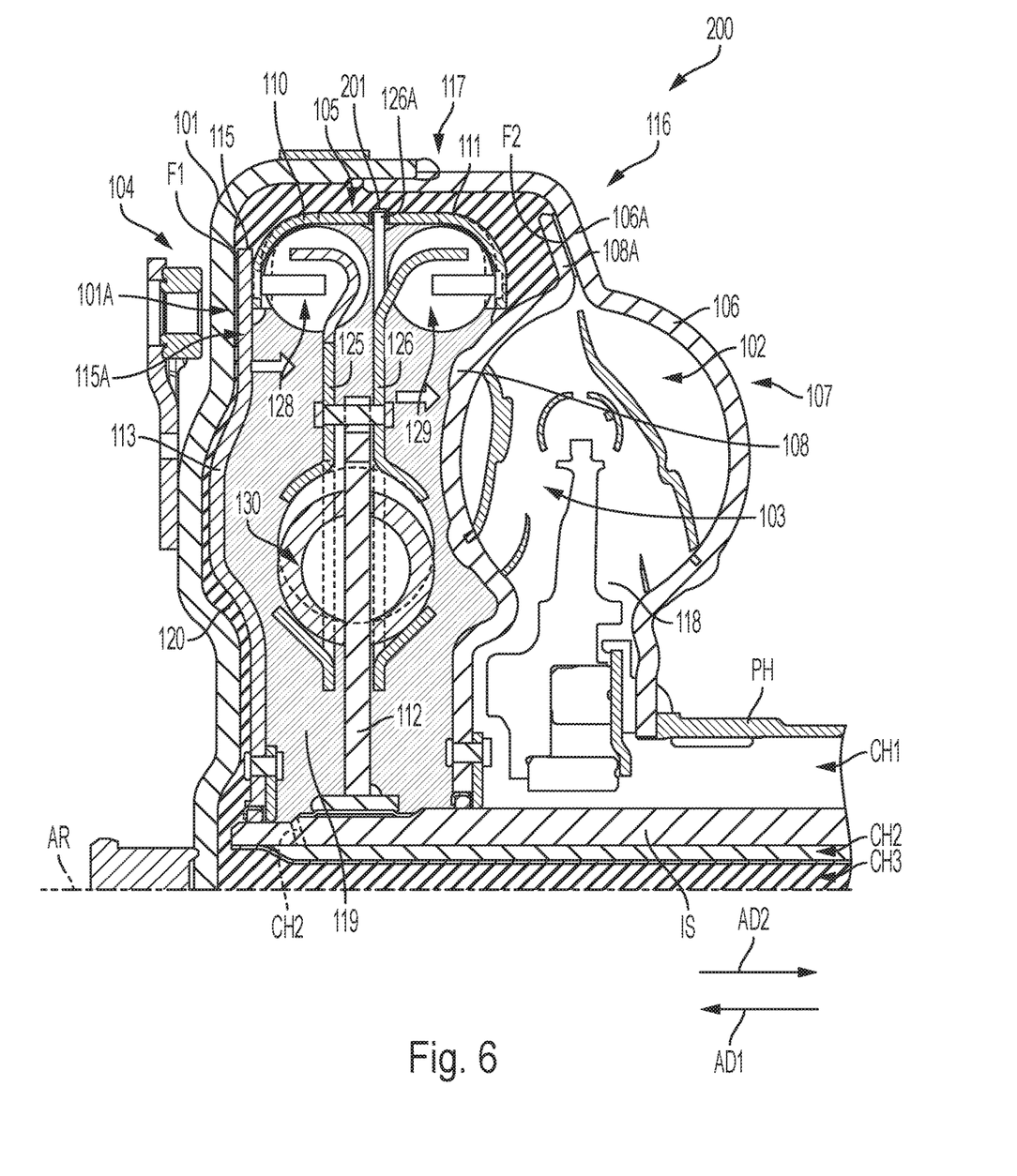
FIG. 6 is a partial cross-sectional view of the torque converter of FIG. 5 in a second lock-up mode.

FIG. 6 is a partial cross-sectional view of torque converter 200 of FIG. 5 in a second lock-up mode.

Figure 7:
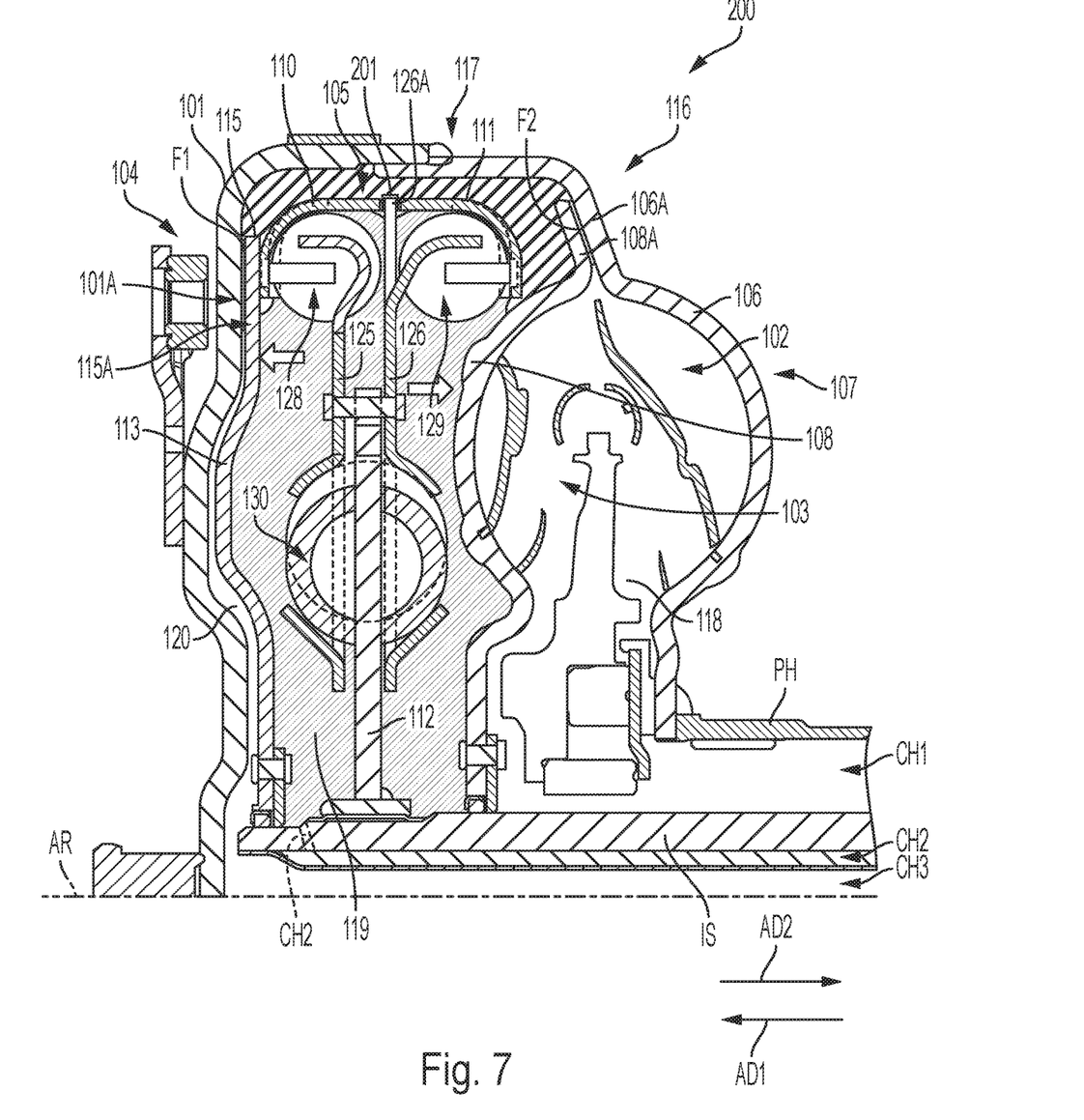
FIG. 7 is a partial cross-sectional view of the torque converter of FIG. 5 in a third lock-up mode.

FIG. 7 is a partial cross-sectional view of torque converter 200 of FIG. 5 in a third lock-up mode. The discussion above pertaining to torque converter 100 applies to torque converter 200 except as noted below. Chamber 119 is at least partially formed by piston 115 and turbine shell 108. Torque converter 200 does not include a seal element sealing chamber 119 with respect to chambers 118 and 120. Instead, opening 201 is present between input components 110 and 111. Chamber 119 is hydraulically connected to chambers 118 and 120 when clutches 116 and 104, respectively, are open, since opening 201 enables pressurized fluid to pass between chamber 119 and chambers 118 and 120. In an example embodiment, when clutches 104 and 116 are closed, pressurized fluid from chamber 119 flows to chambers 118 and 120 through grooves in the respective friction material for clutches 104 and 116.

For the lock-up mode of FIG. 5, chambers 118 and 119 are pressurized with respect to chamber 120 to close clutch 104. Pressurized fluid in chambers 118 and 119 mixes through opening 201 to keep clutch 116 open. For the lock-up mode of FIG. 6, chambers 119 and 120 are pressurized with respect to chamber 118 to close clutch 116. Pressurized fluid in chambers 119 and 120 mixes through opening 201 to keep clutch 104 open. For the lock-up mode of FIG. 7, chamber 119 is pressurized with respect to chambers 118 and 120.

Advantageously, torque converter 200 provides a cost savings since seal element 121 is an expensive component. Vibration damper 105 shown in FIGS. 2 through 7 is less complex, requires less space in the torque converter, has a small parts count, and has a smaller cost in comparison to the dual vibration damper configuration discussed above due to the use of a single output flange 112 to connect input components 110 and 111 to input shaft IS.

Figure 8:
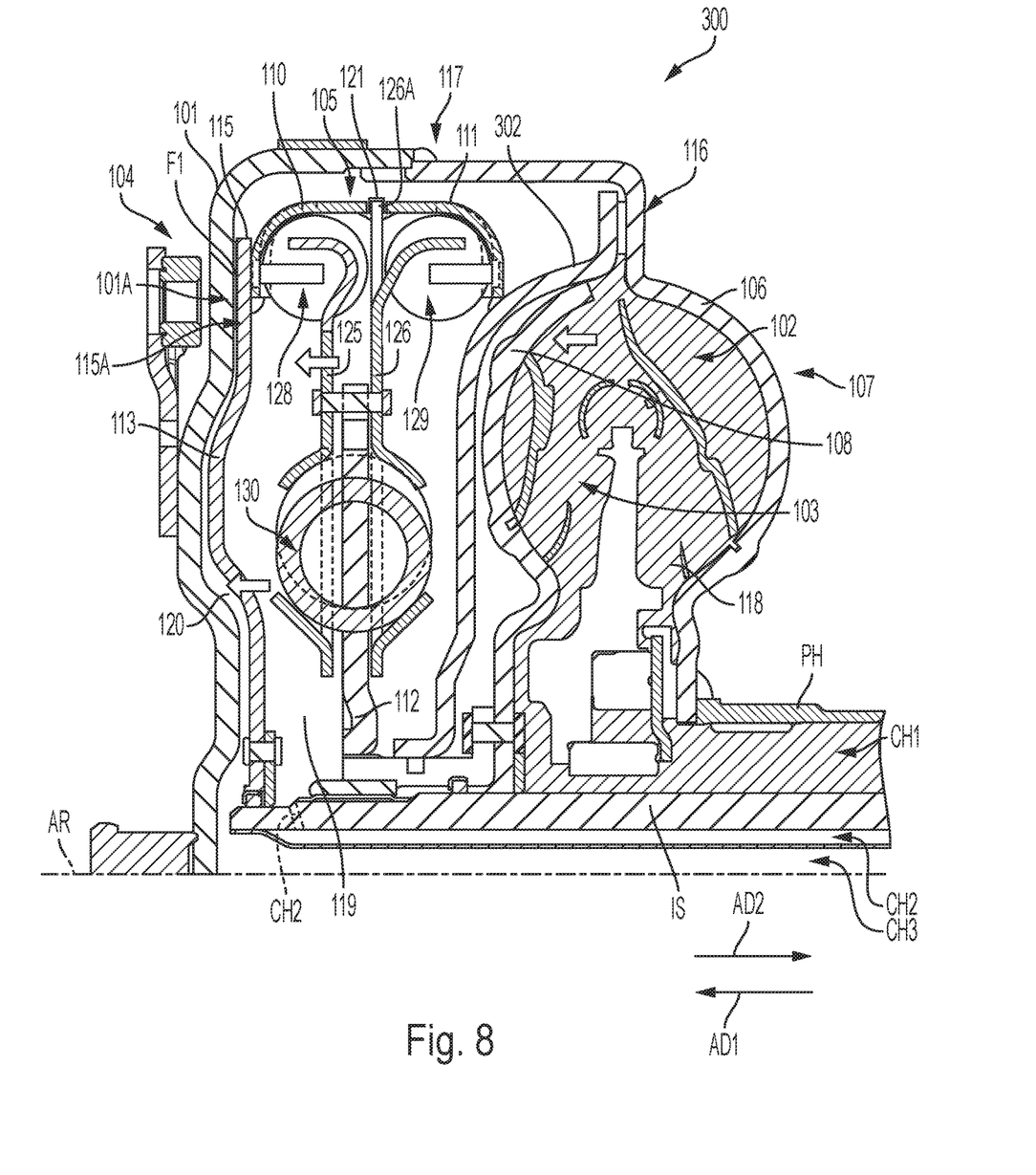
FIG. 8 is a partial cross-sectional view of a torque converter including dual clutches and a simplified vibration damper, in a first lock-up mode.

FIG. 8 is a partial cross-sectional view of torque converter 300 including dual clutches and a simplified vibration damper in a first lock-up mode. The discussions above regarding the structure and function of torque converter 100 in FIGS. 2 through 4 applies to torque converter 300 except as noted. Clutch 116 includes axially displaceable piston 302. Piston 302 is separate from turbine shell 108 and non-rotatably connected to input component 111. Chamber 118 includes a portion bounded by piston 302 and shell 108. For the lock-up mode of FIG. 8, chamber 118 is pressurized to urge piston 302 in direction AD1, which urges input components 111 and 110 and piston 115 in direction AD1 to close clutch 104.

Figure 9:
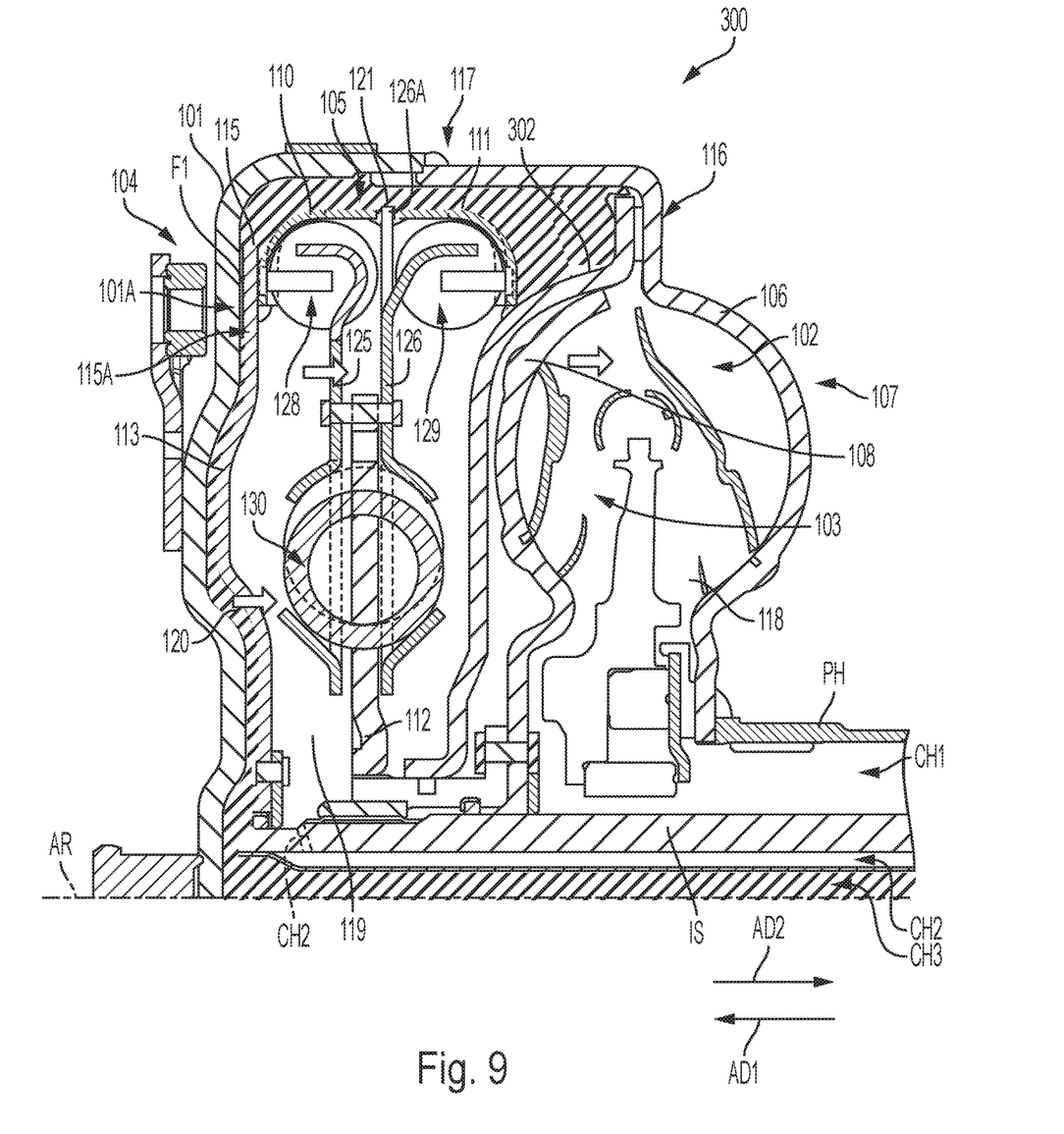
FIG. 9 is a partial cross-sectional view of the torque converter of FIG. 8 in a second lock-up mode.

FIG. 9 is a partial cross-sectional view of torque converter 300 including dual clutches and a simplified vibration damper in a second lock-up mode. In the lock-up mode shown in FIG. 9, chamber 120 is pressurized to displace piston 115 in direction AD2 to open clutch 104 and displace input components 110 and 111 and piston 302 in direction AD2 to close clutch 116.

Figure 10:
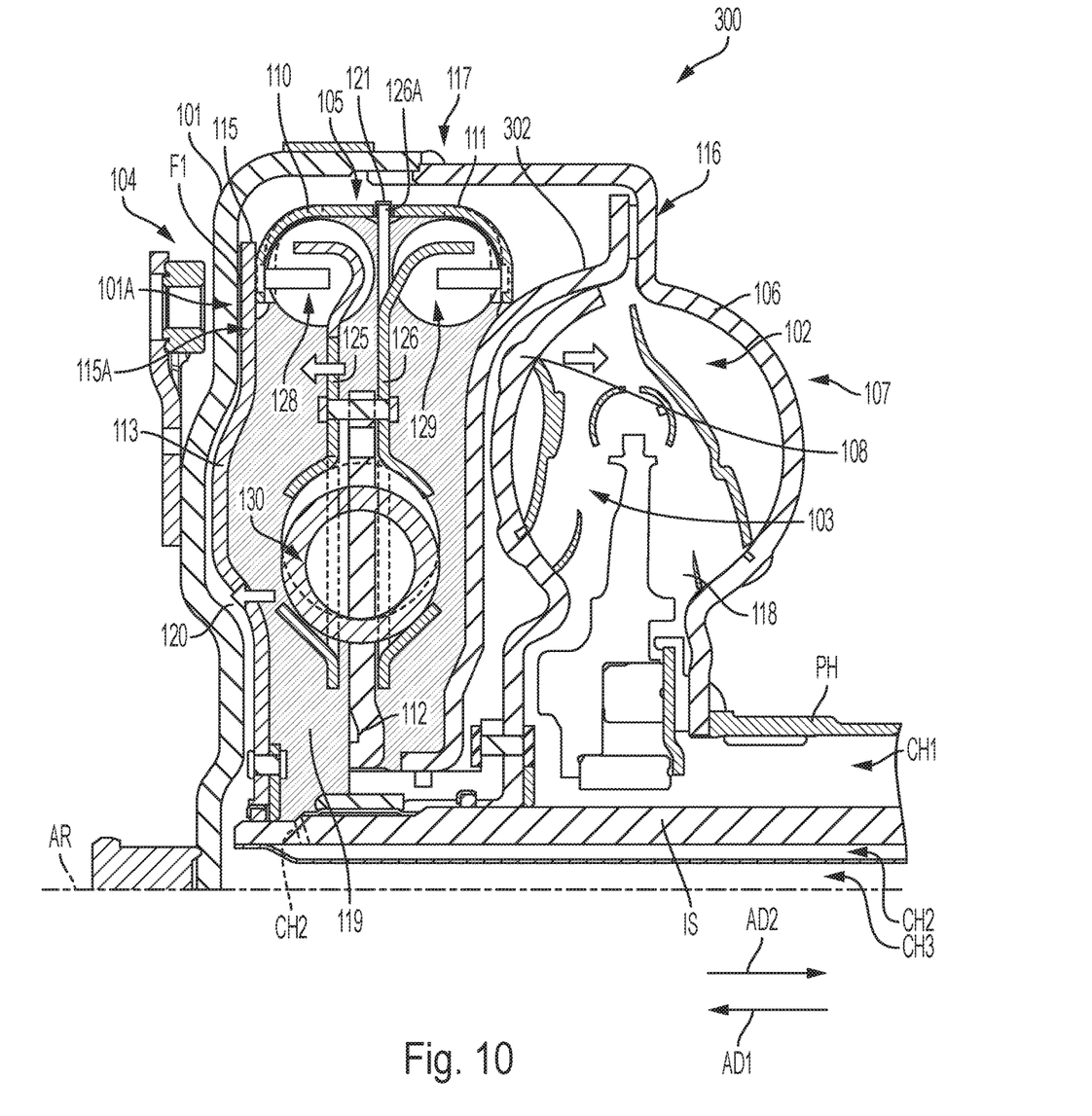
FIG. 10 is a partial cross-sectional view of the torque converter of FIG. 8 in a third lock-up mode; and, FIG. 11 is a partial cross-section of a prior art torque converter.

FIG. 10 is a partial cross-sectional view of torque converter 300 including dual clutches and a simplified vibration damper in a third lock-up mode. In the lock-up mode shown in FIG. 10, chamber 119 is pressurized to displace piston 115 in direction AD1 to close clutch 104 and displace piston 302 in direction AD2 to close clutch 116.

Advantageously, chamber 119 is sealed with respect to chambers 118 and 120 by seal element 121. Clutch gain, which is calculated by dividing clutch capacity by clutch apply pressure, is manipulated and improved through use of clutch 104, clutch 116 and sealed chamber 119 of torque converters 100 and 300. For example, as noted above, the supply of pressurized fluid to torque converters 100 and 300 is limited; and therefore, the apply pressure noted above can be considered constant at the limited pressure available. For the lock-up mode shown in FIGS. 4 and 10, chamber 119 is pressurized to close clutches 104 and 116 to increase the clutch capacity of torque converters 100 and 300. Advantageously, chamber 119 is pressurized without the losses to chambers 118 and 120 noted above. Thus, the pressure available for clamping clutches 104 and 116 is increased. Thus, clutch gain can be increased by the use of dual clutches and the positioning (diameter) of seal element 121.

Advantageously, the example embodiment of torque converters 100 and 300 in FIGS. 2 through 4 and 8 through 10, respectively, simplifies the control schemes needed to control clutches 104 and 116. For example, for the lock-up modes shown in FIGS. 2 and 3, and 8 and 9, only chambers 118 and 120, respectively, need to be pressurized. In the prior art, two chambers, including a chamber with the vibration dampers, needed to be pressurized to close one of the clutches and keep the other of the clutches open. As noted above, in the lock-up mode shown in FIGS. 4 and 10, energy losses due to flow of fluid from a high pressure chamber 119 to lower pressure chambers 118 and 120 are avoided.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torque converter, comprising:
an axis of rotation;
a cover arranged to receive torque;
an impeller including an impeller shell non-rotatably connected to the cover;
a turbine in fluid communication with the impeller and including a turbine shell;
a first clutch;
a second clutch;
a vibration damper including:
a first input component non-rotatably connected to a component of the first clutch;
a second input component non-rotatably connected to a component of the second clutch;
a first spring engaged with the first or second input component;
a first cover plate engaged with the first spring and including a radially outermost distal second input components against the first cover plate; and
an output flange arranged to non-rotatably connect to an input shaft for a transmission, wherein for a first lock-up mode, the first and second clutches are arranged to close to transmit torque from the cover to the first and second input components, respectively.

2. The torque converter recited in claim 1, wherein:
for a second lock-up mode, the first clutch is arranged to close to transmit torque from the cover to the first input component, while the second clutch is open; and,
for a third lock-up mode, the second clutch is arranged to close to transmit torque from the cover to the second input component, while the first clutch is open.

3. The torque converter recited in claim 2, wherein:
for the first lock-up mode, the torque converter has a first torque capacity;
for the second lock-up mode, the torque converter has a second torque capacity less than the first torque capacity; and,
for the third lock-up mode, the torque converter has a third torque capacity different from the second torque capacity and less than the first torque capacity.

4. The torque converter recited in claim 2, wherein:
the first clutch includes a piston;
the component of the first clutch is the piston; and,
for the first and second lock-up modes:
the piston is axially displaceable to frictionally engage the cover; and,
the piston is arranged to transmit torque to the first input component.

5. The torque converter recited in claim 2, wherein for the first and third lock-up modes, the component of the second clutch is arranged to axially displace to frictionally engage the impeller shell.

6. The torque converter recited in claim 5, wherein the component of the second clutch is the turbine shell.

7. The torque converter recited in claim 5, wherein:
the second clutch includes a piston rotatable with respect to the turbine shell; and,
the component of the second clutch is the piston.

8. The torque converter recited in claim 2, wherein:
the vibration damper includes:
the first cover plate and a second cover plate;
the first spring engaged with the first input component and the first cover plate;
a second spring engaged with the second input component and the second cover plate; and,
a third spring engaged with the first cover plate, the second cover plate, and the output flange, wherein:
for the first, second and third lock-up modes, the first and second cover plates are arranged to transmit torque from the cover to the output flange.

9. The torque converter recited in claim 2, further comprising:
a first chamber at least partially formed by the component for the second clutch and the impeller;
a second chamber at least partially formed by the first and second input components and the component of the second clutch; and,
a third chamber at least partially formed by the cover and the component of the first clutch, wherein for the second lock-up mode:
fluid pressure in the first chamber is higher than fluid pressure in the third chamber; and, the component of the first clutch is arranged to frictionally engage the cover to transmit torque from the cover to the first input component.

10. The torque converter recited in claim 2, further comprising:
a first chamber at least partially formed by the component for the second clutch and the impeller;
a second chamber at least partially formed by the first and second input components and the component of the second clutch; and,
a third chamber at least partially formed by the cover and the component of the first clutch, wherein for the third lock-up mode:
fluid pressure in the third chamber is higher than fluid pressure in the first chamber; and,
the second clutch is arranged to close to transmit torque from the cover to the second input component.

11. The torque converter recited in claim 1, further comprising:
a first chamber at least partially formed by the component of the second clutch and the impeller;
a second chamber at least partially formed by the first and second input components and the component of the second clutch; and,
a third chamber at least partially formed by the cover and the component of the first clutch, wherein for the first lock-up mode:
fluid pressure in the second chamber is higher than respective fluid pressures in the first and third chambers; and,
the first and second input components are arranged to transmit torque from the cover to the output flange.

12. The torque converter recited in claim 1, further comprising:
a first chamber at least partially formed by the component for the second clutch and the impeller;
a second chamber at least partially formed by the first and second input components and the component of the second clutch; and,
a third chamber at least partially formed by the cover and the component of the first clutch, wherein the output flange is located in the second chamber.

13. The torque converter recited in claim 1, further comprising:
a first chamber at least partially formed by the component for the second clutch and the impeller;
a second chamber at least partially formed by the first and second input components and the component of the second clutch;
a third chamber at least partially formed by the cover and the component of the first clutch; and,
first, second, and third channels:
connected to the first, second, and third chambers, respectively; and,
hydraulically isolated from each other, wherein:
the first channel is arranged to connect to a pump for the transmission; and,
the second and third channels are arranged to hydraulically connect to the pump via fourth and fifth hydraulically isolated channels, respectively, in the transmission input shaft.

14. A torque converter, comprising:
an axis of rotation;
a cover arranged to receive torque;
an impeller including an impeller shell non-rotatably connected to the cover;
a turbine in fluid communication with the impeller and including a turbine shell;
a first clutch axially displaceable to engage the cover;
a second clutch axially displaceable to engage the impeller shell; and,
a vibration damper including:
a first input component non-rotatably connected to a component of the first clutch;
a second input component non-rotatably connected to a component of the second clutch;
first and second cover plates, wherein the first or second cover plate includes a radially outermost distal end;
a seal element fixed to the radially outermost end and sealing the first and second input components against the first or second cover plate; and
an output flange arranged to non-rotatably connect to an input shaft for a transmission,
wherein for a first lock-up mode, the first and second input components are arranged to transmit torque from the cover to the output flange; and,
wherein:
the component for the second clutch s the turbine shell; or,
the second clutch includes a piston separate from the turbine shell, and the component for the second clutch is the piston.

15. The torque converter recited in claim 14, wherein:
for a second lock-up mode, the second clutch is open and the first clutch is arranged to close to transmit torque from the cover to the first input component; and,
for a third lock-up mode, the first clutch is open and the second clutch is arranged to close to transmit torque from the cover to the second input component.

16. The torque converter recited in claim 15, wherein:
for the first lock-up mode, the torque converter has a first torque capacity;
for the second lock-up mode, the torque converter has a second torque capacity different from the first torque capacity; and,
for the third lock-up mode, the torque converter has a third torque capacity greater than the first torque capacity and greater than the second torque capacity.

17. A torque converter, comprising:
an axis of rotation;
a cover arranged to receive torque;
an impeller including an impeller shell non-rotatably connected to the cover;
a turbine in fluid communication with the impeller and including a turbine shell;
a first clutch;
a second clutch;
a vibration damper including:
a first input component non-rotatably connected to a component of the first clutch;
a second input component non-rotatably connected to a component of the second clutch;
a spring engaged with the first or the second input component;
a seal element disposed radially outside the spring and sealed against the first and second input components; and,
an output flange arranged to non-rotatably connect to an input shaft for a transmission;
a first chamber at least partially formed by the impeller and the component of the second clutch;

a second chamber at least partially formed by the component of the first clutch, the seal element, and the first and second input components; and, a third chamber at least partially formed by the cover and the component of the first clutch.

18. The torque converter recited in claim 17, wherein for a lock-up mode, the first and second clutches are arranged to close to transmit torque from the cover to the first input component.

\* \* \* \* \*